US011080036B2

(12) United States Patent
Juven et al.

(10) Patent No.: US 11,080,036 B2
(45) Date of Patent: Aug. 3, 2021

(54) SOFTWARE-UPDATING METHOD FOR A WIRELESS COMMUNICATION NETWORK

(71) Applicant: WIREPAS OY, Tampere (FI)

(72) Inventors: Ville Juven, Tampere (FI); Jussi Ylänen, Tolland, CT (US); Ville Kaseva, Tampere (FI)

(73) Assignee: WIREPAS OY, Tampere (FI)

( * ) Notice: Subject to any disclaimer, the term of this patent is extended or adjusted under 35 U.S.C. 154(b) by 0 days.

(21) Appl. No.: 15/938,200

(22) Filed: Mar. 28, 2018

(65) Prior Publication Data

US 2019/0303126 A1  Oct. 3, 2019

(51) Int. Cl.
*G06F 9/44* (2018.01)
*G06F 8/65* (2018.01)
*H04L 29/08* (2006.01)
*H04W 84/18* (2009.01)
*H04W 28/02* (2009.01)
*H04W 4/80* (2018.01)
*H04W 76/40* (2018.01)

(52) U.S. Cl.
CPC ............... *G06F 8/65* (2013.01); *H04L 67/34* (2013.01); *H04W 4/80* (2018.02); *H04W 28/0278* (2013.01); *H04W 76/40* (2018.02); *H04W 84/18* (2013.01)

(58) Field of Classification Search
CPC ............ G06F 8/65; H04L 67/34; H04W 4/80; H04W 28/0278; H04W 76/40; H04W 84/18
USPC .................................................. 717/168–178
See application file for complete search history.

(56) References Cited

U.S. PATENT DOCUMENTS

| 7,065,347 | B1 | 6/2006 | Vikse et al. |
| 7,814,322 | B2* | 10/2010 | Gurevich ............... H04L 45/20 370/252 |
| 9,031,007 | B2* | 5/2015 | Shin .................. H04W 72/1278 370/329 |
| 2012/0214474 | A1 | 8/2012 | Zeilingold |
| 2014/0173579 | A1* | 6/2014 | McDonald ............... G06F 8/65 717/170 |
| 2016/0029403 | A1* | 1/2016 | Roy .................. H04W 72/0406 370/336 |
| 2016/0266885 | A1 | 5/2016 | Aleksandrov |

(Continued)

FOREIGN PATENT DOCUMENTS

CN  107770285  3/2018

OTHER PUBLICATIONS

Jerome Henry, "802.11s Mesh Networking", 2011, CWNP, downloaded from https://www.cwnp.com/uploads/802-11s_mesh_networking_v1-0.pdf, 30 pages (Year: 2011).*

(Continued)

*Primary Examiner* — Ted T. Vo
(74) *Attorney, Agent, or Firm* — Nixon & Vanderhye

(57) ABSTRACT

Disclosed is a wireless communication network including radio nodes, which include a first radio node and a second radio node. The nodes are configured to provide a bi-directional radio communication between each other. The nodes are configured to receive a software-distribution package. In addition, the first node sends to at least the second node a timer frame indicating when all nodes of the network start to execute the received package in order to update a software of the nodes.

20 Claims, 4 Drawing Sheets

(56) References Cited

U.S. PATENT DOCUMENTS

2017/0127361 A1  5/2017  Zima et al.
2017/0171018 A1  6/2017  Hodroj

OTHER PUBLICATIONS

Ishmael et al., "MeshUp: Reliably Evolving a Living Lab", 2010, ACM, pp. 23-30. (Year: 2010).*
GB Search Report for Application No. GB1805040.1, dated Oct. 1, 2018.
European Search report dated May 24, 2019 in EP Application No. 19 16 4509.

* cited by examiner

DLC = Download command
DLCA = Download command ack
SgN = Segment number
DS = Data segment DSA = Data segment ack
TtE = Time to Execution
RNA = Reporting node address

SOFTWARE-UPDATING METHOD FOR A WIRELESS COMMUNICATION NETWORK

TECHNICAL FIELD

The application relates generally to a software-updating method for a wireless communication network.

BACKGROUND

In wireless communication networks, e.g. in wireless mesh networks, there is a need to deliver and take into use new software versions for both device application and communication protocols. A new software version for communication protocols could be needed for e.g. due to correcting software error, improving performance, or adding new functionality improving mesh network operation.

One known solution is an over-the-air software delivery to wireless devices, which performs an independent data download from a software distribution server, usually managed as individual point-to-point delivery and takes the new software version in use independently, in asynchronous manner. This results that the network has different types of devices operating in the system: a part of the devices still use an old software and a part of the devices use the new software. So, the new communication protocol software has to be fully backwards compatible so that the devices with the new software can operate in old networks, utilizing only old functionality until all the devices have the new software.

However, the known solution allows that the distribution of the new software can be done in longer time avoiding high distribution load as well as each device can take the new software in use when suitable for to the end user.

SUMMARY

One object of the invention is to provide a distribution and application of a new software package for communication protocols in wireless communication networks.

One object of the invention is fulfilled by a wireless communication network, a radio node device, software-updating methods, a computer program, and a computer-readable medium according to the independent claims.

One embodiment is a wireless communication network (system) comprising radio nodes, which comprise a first radio node and a second radio node. The nodes are configured to provide a bi-directional radio communication between each other. The nodes are configured to receive a software-distribution package. In addition, the first node sends to at least the second node a timer frame indicating when all nodes of the network start to execute the received package in order to update a software of the nodes.

One embodiment is a software-updating method for a wireless communication network in accordance with the previous embodiment. The method comprises a tep of receiving, by the radio nodes, a software-distribution package. In addition, the method comprises steps of sending, by the first radio node, to at least the second node a timer frame indicating when all nodes of the network start to execute the package and receiving, by at least the second node, the timer frame.

One embodiment is a radio node device (apparatus) for a wireless communication network in accordance with the previous embodiment. The node device comprises a microcontroller and a radio transceiver. The node device is configured to provide, by the radio transceiver, a bi-directional radio communication with at least one another radio node device and to receive, by the radio transceiver, a software-distribution package. In addition, the node device sends, by the radio transceiver, to the at least one another node device a timer frame indicating when all radio node devices of the network start to execute the received package in order to update a software of the devices.

One embodiment is a software-updating method for the radio node device in a wireless communication network in accordance with the previous embodiments. The method comprises steps of providing, by the radio transceiver, a bi-directional radio communication with at least one another radio node device and receiving, by the radio transceiver, a software-distribution package. In addition, the method comprises a step of sending, by the radio transceiver, to the at least one another node device a timer frame indicating when all radio node devices of the network start to execute the received package in order to update a software of the devices.

One embodiment is a computer program (software) for software-updating by means of the radio node device in a wireless communication network in accordance with the previous embodiments, when run in the node device (computer). The program comprises a communication code for providing, by the radio transceiver, a bi-directional radio communication with at least one another radio node device and a reception code for receiving, by the radio transceiver, a software-distribution package. In addition, the program comprises a sending code for sending, by the radio transceiver, to the at least one another node device a timer frame indicating when all radio node devices of the network start to execute the received package in order to update a software of the devices.

One embodiment is a tangible non-volatile computer readable medium comprising the computer program in accordance with the previous embodiment. The program for software-updating is performed by means of the radio node device in a wireless communication network in accordance with the previous embodiments, when run in the node device. The program comprises a communication code for providing, by the radio transceiver, a bi-directional radio communication with at least one another radio node device and a reception code for receiving, by the radio transceiver, a software-distribution package. In addition, the program comprises a sending code for sending, by the radio transceiver, to the at least one another node device a timer frame indicating when all radio node devices of the network start to execute the received package in order to update a software of the devices.

Further embodiments are disclosed in the dependent claims.

BRIEF DESCRIPTION OF THE FIGURES

The embodiments are presented with reference to the following figures.

DETAILED DESCRIPTION OF THE FIGURES

Figure 1:
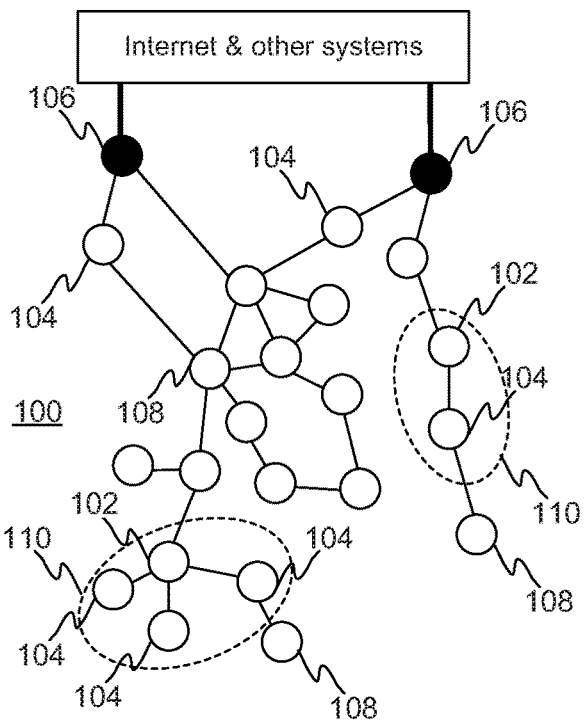
FIG. 1 presents an example of a wireless communication network

FIG. 1 presents a wireless communication network system 100, which is e.g. a wireless mesh network (WMN).

The WMN 100 can be e.g. a wireless sensor network (WSN) and it is designed, but not limited, for radio systems using e.g. 5 GHz, 2.4 GHz, 868 MHz, 870 MHz, and 915 MHz unlicensed frequency bands. Similarly, operation in any licensed spectrum or Shared Licensed Access (LSA) spectrum can be supported.

The wireless communication in the network 100 can be based on e.g. Bluetooth Low Energy (BLE), IEEE 802.15 standard, IEEE 802.11 standard, or other radio protocol.

The network 100, which is the WMN, can comprise radio node devices 102, 104, 106, 108 and these node devices 102, 104, 106, 108 communicate by using a bi-directional radio communication between each other in a format of communication frames to each other.

The network 100 comprises at least one radio sink node (gateway) device 106, e.g. one, two, three, four or more sink nodes 106.

The network 100 can comprise at least one cluster 110.

Each cluster 110 of the network 100 comprises a router (head node) device 102 and at least one member node (subnode) device 104.

The at least one member node 104 can comprise e.g. one, two, three, four, five or more nodes 104.

In addition, the network 100 can have routers 102 without member nodes 104. This can be especially important at the edge of the network 100 allowing possible new nodes 104, 108 to find the existing network 100.

Alternatively, all nodes of the network 100 can operate as routers 102 and transmit a beacon (message) enabling any other node 104, 108 to transmit for it. Thus, an operation where only part of nodes 102, 104, 108 operate as routers 102 is an optimization of the network 100.

The router 102 communicates with the at least one member node 104 inside its cluster 110 and with a sink node (gateway) device 106 or other router 102 of the network 100 outside its cluster 110.

Alternatively, the network 100 can comprise only single sink node 106, which operates as a router 102 and other nodes 104, 108 are connected with that, whereupon the nodes 104, 108 connected to the sink node 106 function as member nodes 104, 108 and, thus, forming one cluster 110. However, a typical sensor network is such that all nodes 102, 104, 108 cannot communicate directly with the sink node 106 due to extensive distance between nodes 102, 104, 106, 108 and limited radio range, whereupon it is needed multi-link (multi-hop) communication between a node 102, 104, 108 and the sink 106.

FIG. 2a-2g present how a certain software (firmware), which nodes 102, 104, 106, 108 use, is updated in the network 100 in accordance with an updating method 211.

The software can be e.g. a communication, control, or monitoring application for the nodes 102, 104, 106, 108.

Figure 5:
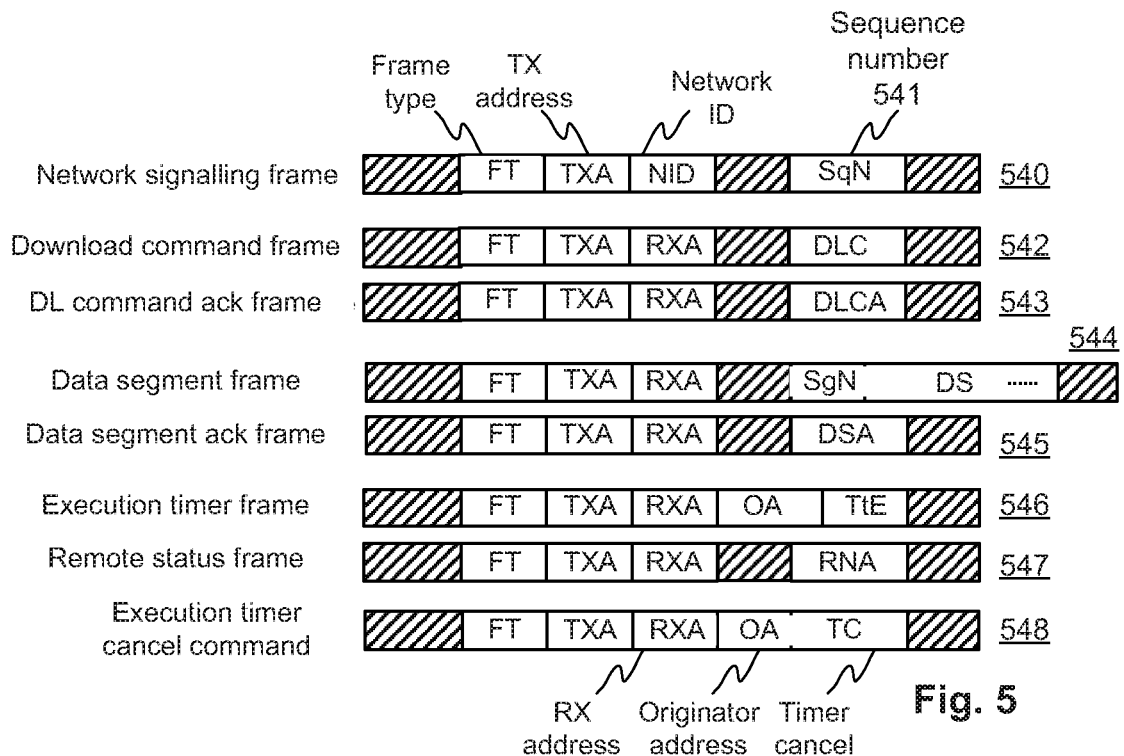
FIG. 5 presents examples of communication frames used in the method

The communication of this over-the-air programming method 211 is performed by using e.g. communication frames 540, 542, 543, 544, 545, 546, 547, 548 in accordance with FIG. 5.

The control and monitoring of the over-the-air programming method 211 is done through sink nodes 106, but each node 102, 104, 108 in the network 100 has responsibility to follow possible coming software updates and act properly once such updating need is detected.

Figure 2A:
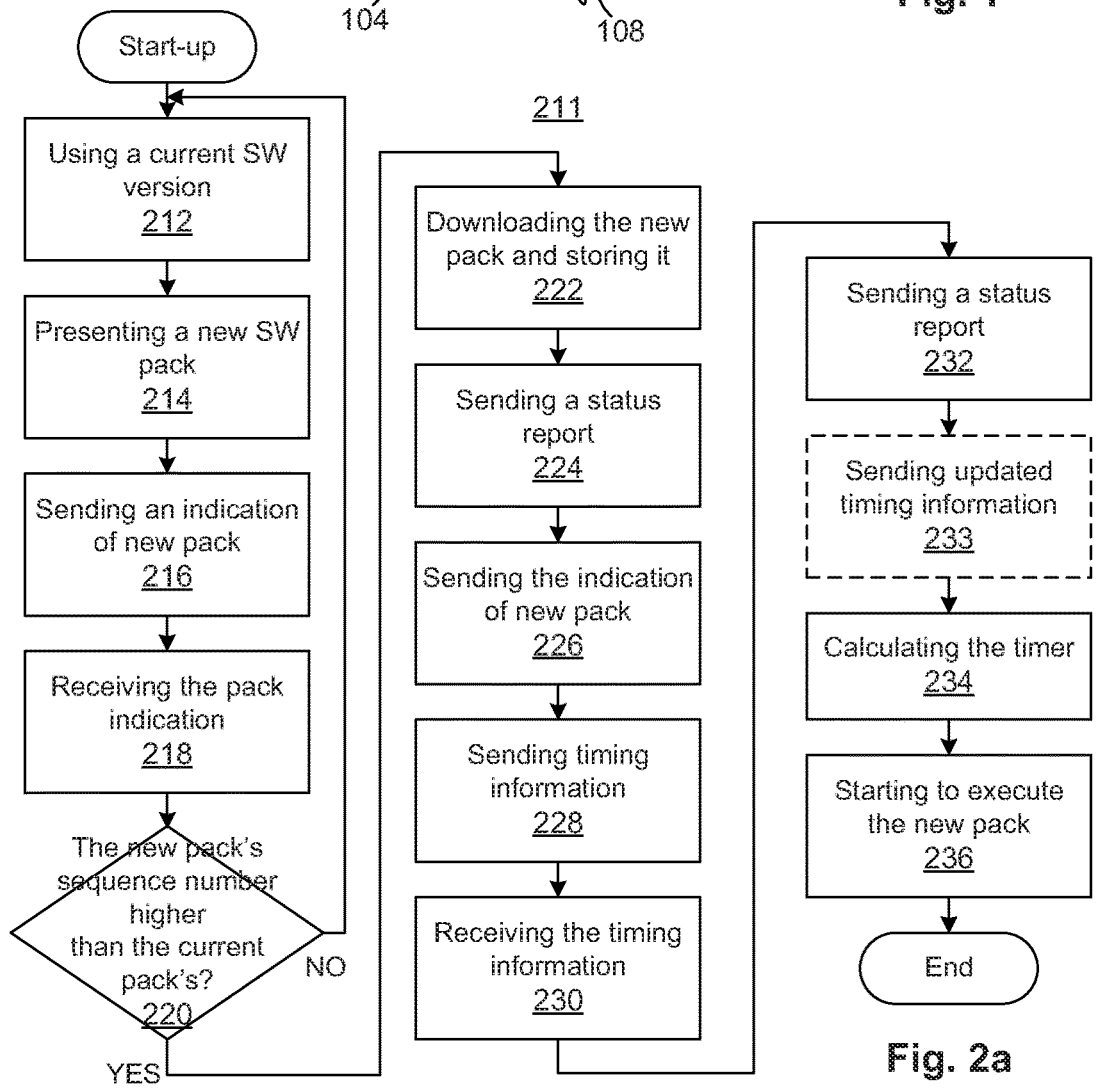
FIG. 2*a*-2*g* present an example of a software-updating method
Figure 2B:
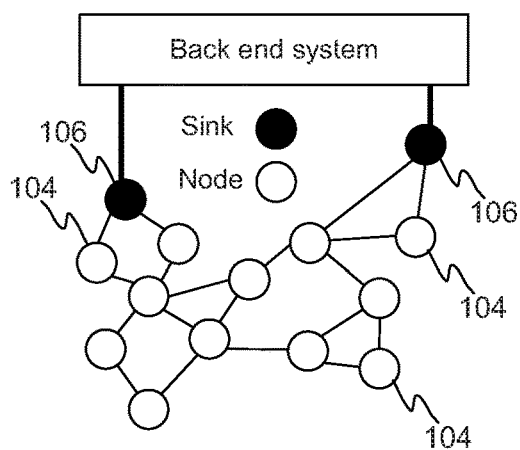
Figure 2C:
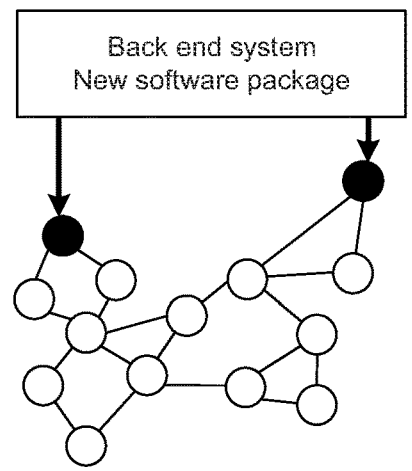

At a step 212 of the method 211 all nodes 104, 106, 108 use a current (run-time) version of the software and the same version is in a memory of each node 102, 104, 106, 108 according to FIG. 2b. The used version of the software is indicated by e.g. a sequence number 541.

At a step 214 a new software-distribution package, which is used to update the current version, is presented in the network 100. Each sink node 106 receives the package from a back end system of the network 100 according to FIG. 2c and stores the package in its memory.

Figure 2D:
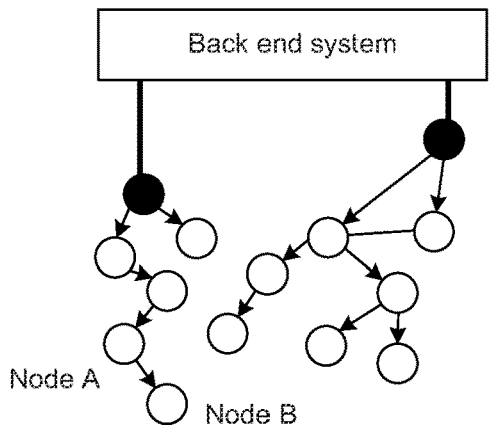

At a step 216, when the sink node(s) 106 has stored the package, each sink node 106 start to advertise the new package by sending frequently a signalling frame 540, which indicates availability to acquire the package, in accordance with FIG. 2d. The indication of the new package can be e.g. a new sequence 541 number in the signalling frame 540.

At a step 218, all nodes 104, which are within a communication range of the sink node(s) 106 receive the signalling frame 540 and the indication of the new package.

At a step 220, each node 104, which has received the indication of the new package, determines whether to acquire the indicated new package on a grounds of the indication in the signalling frame 540.

The determination can be based on the sequence numbers 541 of the current version and new package. This enables to use the principle the higher the sequence number 541 is, the newer the version is. Alternatively, if an older version of software needs to be re-distributed, e.g. due to an error in the current version, the old version is assigned a higher sequence number 541. In any case, each node 104 compares the sequence numbers 541 in order to determine should it acquire the available, indicated package.

At the step 220, when the determination indicates that the new package is older or the same version as the current version, which the node 104 uses and which it has stored in its memory, it continues similarly as before by using the current version and by scanning new signalling frames 540.

Figure 3:
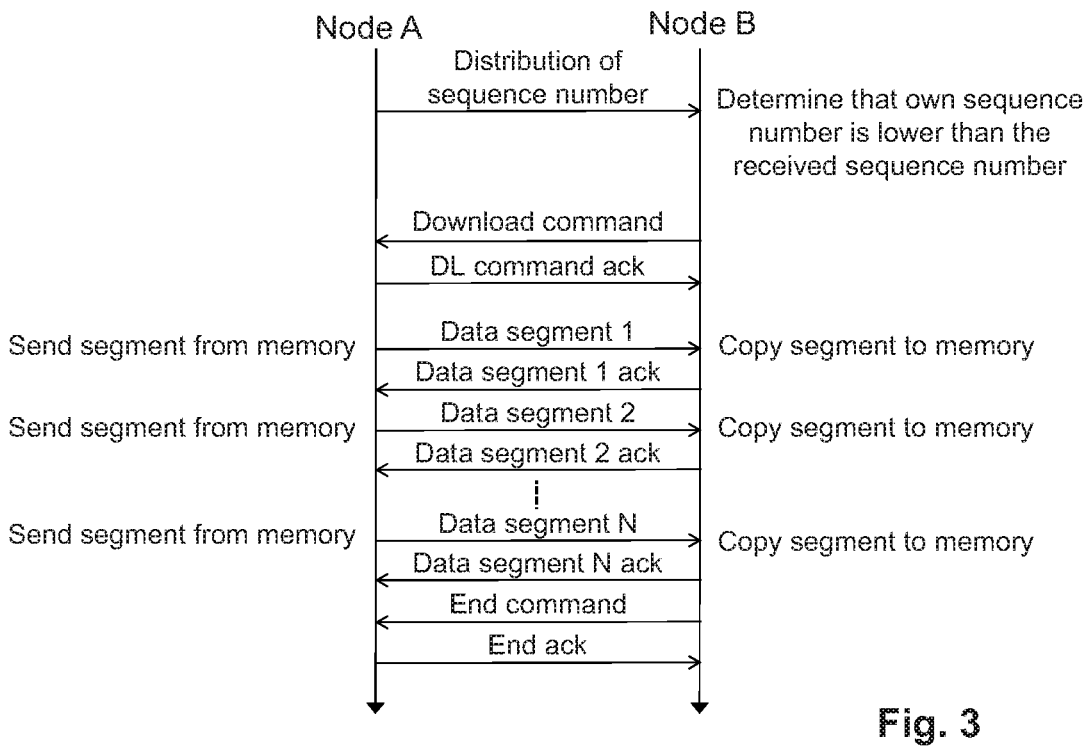
FIG. 3 presents an example of a download of a software-distribution package presented in FIG. 2*d*

When the determination indicates that the new package is newer than the current version, which means that the new package is available in some neighboring node 104, 106, the node 104 downloads the new package from the sink node 106, or from other node 104, which already has the new package, by using a download protocol according to FIG. 3.

At a step 222, the node 104 sends a download command frame 542, which starts a download of the new package, to the sink node 106 or to other node 104 within a communication range of the node 104.

When the sink node 106, or this other node 104, receives the download command frame 542, it sends a download command acknowledgement frame 543 to the node 104, whereupon the node 104 prepares itself to receive the new package from the sender of the acknowledgement frame.

The sink node 106, or the other node 104, sends the new package, by means of at least one data segment frame 544, from its memory to the ready node 104. The new package can be sent in dozens, hundreds, or more data segment frames 544.

After each received data segment frame 544, the node 104 stores the received data segment of the new package in its memory and sends a data segment acknowledgement frame 545 in order to inform the sender that it has received the previous data segment frame 544.

Finally, when the last data segment frame 544 has been received and its data segment acknowledgement frame 545 has been sent to the sink node 106, or the other node 104, the node 104 send an end command frame, which indicates that it has completed the reception of the new package.

Each node 102, 104, 106, 108 that received the new package continues to run the current version of the software for the present.

Figure 2E:
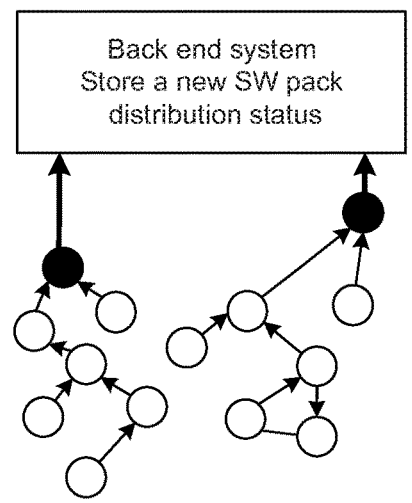

At a step 224, upon receiving the new package and storing it, the node 104 sends a status report, which reports that it has copied the new package in its memory, in accordance with FIG. 2e. The status report is sent to the sink node 106 directly or other nodes 104 forward it over multiple radio links before it reaches the sink node 106. The sink node 106 collects all status reports from the network 100 in order to monitor the distribution of the new package.

This software-distribution method 211 provides an efficient method to distribute new software package in the network 100 so that it can be ensured that all nodes 102, 104, 106, 108 receive the new package. As there can be hundreds or thousands of nodes 102, 104, 106, 108 in the network 100, an individual download of new software is not practical.

At a step 226, each node 104 that has acquired the new package, start to advertise the new package by sending its sequence number in the signalling frame 540 similarly as the sink node 106 at a step 216. This leads into to the delivery of the new package throughout the multi-link network 100.

All nodes 104, 108, which are within a communication range of the sender node 102 receive the signalling frame 540 and the indication of the new package, and start to perform the determination step 220 and, when necessary, the downloading and transmission steps 222, 224, 226 similarly as the sender node 102.

Figure 2F:
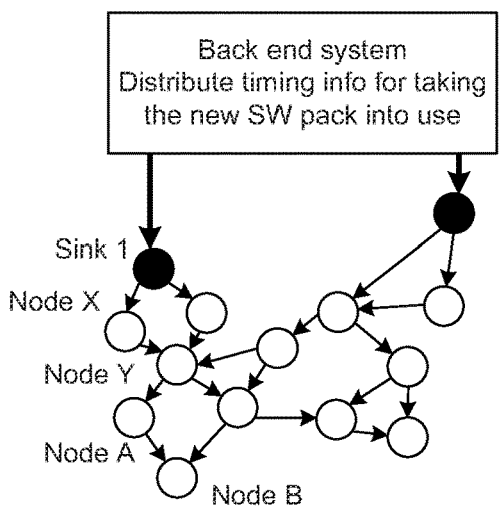

At a step 228, once the sink node 106 has detected that all intended nodes 102, 104, 108 in the network 100 have received the new package, it starts to send timing information in a timer frame 546 in accordance with FIG. 2f. The timer frame 546 indicates the moment of time when all nodes 102, 104, 106, 108 of the network 100 start to execute the received new package in order to update the certain software of the nodes 102, 104, 106, 108 at the same time.

A value of a timer is set on a basis of a propagation delay of the network 100 to let all or at least a desired portion of the nodes 102, 104, 106, 108 to get the timing information and to report its reception before the timer elapses.

At a step 230, all nodes 104, which are within the communication range of the sink node 106, receive the timer frame 546 and its timing information directly and nodes 102, 104, 108, which are outside the communication range, receive the timer frame 546 indirectly over necessary radio links.

Each node 102, 104, 108 sets its update timer according to the timing information in the timer frame 546 after the reception so that it can execute the new package at the same time with other nodes 102, 104, 106, 108.

At a step 232, each node 102, 104, 108, which received the timer frame 546 and set the update timer, sends directly to the sink node 106 or indirectly over necessary radio links a remote status frame 547 indicating that it has received the timing information.

If all or the desired part of the nodes 102, 104, 108 did not report the reception of the timer frame 546 within a predetermined given time, the timer value can be reset and re-distributed.

Figure 4:
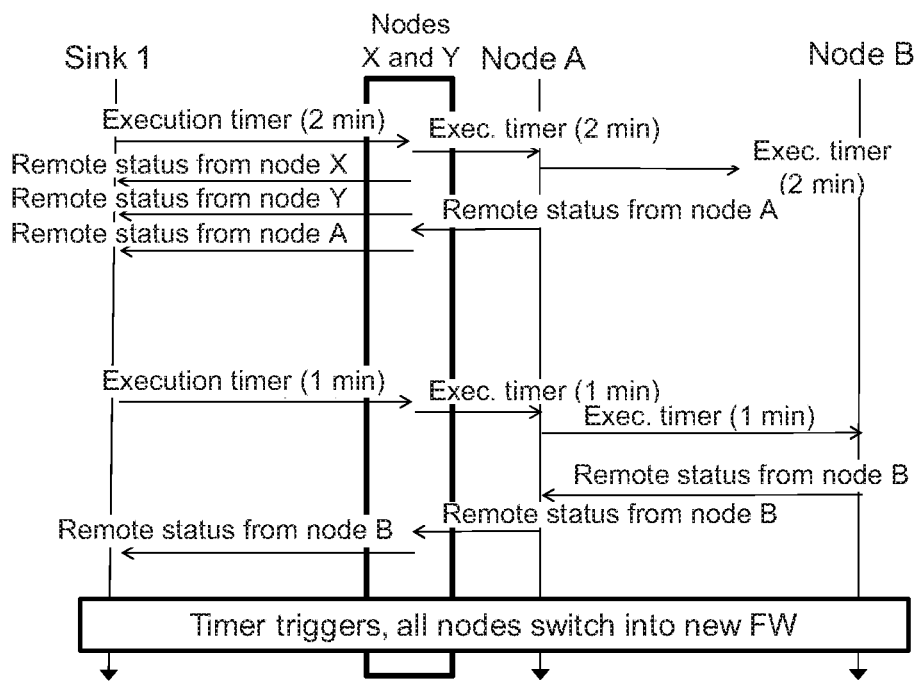
FIG. 4 presents an example of a transmission of timing information presented in FIG. 2*f*

At a step 233, when the sink node 106 detects that all expected remote status frames 547 have not arrived, i.e. at least a status frame 547 of one node 102, 104, 108 lacks according to FIG. 4, it sends updated timing information in the timer frame 546, which indicates the same moment of time when all nodes 102, 104, 106, 108 start to execute the new package, through the network 100.

Then, the sink node 106 start to scan again in order to receive the lacking remote status frames 547, whereupon it can deduce that all nodes 102, 104, 106, 18 have received the timing information.

Alternatively, if the sink node 106 did not receive the remote status frames 547 from all or the desired part of the nodes 102, 104, 108 within the predetermined time, it can deliver a cancel command frame 548 in order to cancel the execution of the new package.

This software-distribution method 211 enables to synchronize the moment when the new software is introduced in to use in the network 100, after successful software distribution. This ensures that all nodes 102, 104, 106, 108 start using the new software at same time and can communicate with using new software that can be non-backwards compatible with previous versions without need for supporting device with legacy software.

At a step 234, the timing elapses according to the calculation of the update timer of each node 102, 104, 106, 108 while all nodes 102, 104, 106, 108 still continues to run the current version.

Figure 2G:
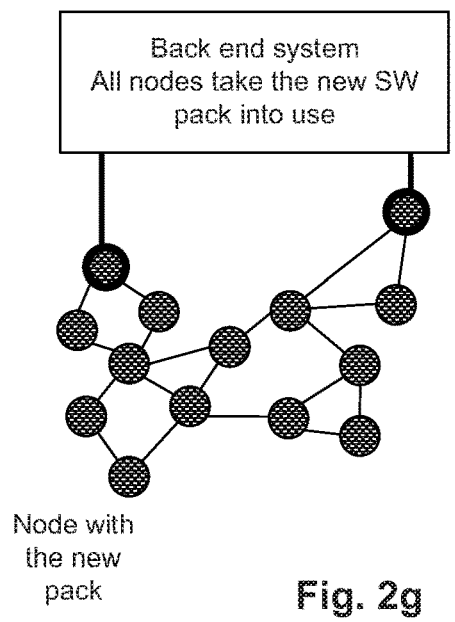

At a step 236, when the update timer indicates the set moment of time, every node 102, 104, 106, 108 of the network 100 take the new version of the software into use instead of the current version by executing the new package in accordance with FIG. 2g.

Alternatively, if the node 102, 104, 108 has acquired the new package at the step 222, but missed the timer frame 546 at the step 228, it can finally, after a long timer, execute it anyway by using a failsafe timer. This strategy is based on an assumption that the missing timer frame 546 is due to (temporarily) missed network links and it is better to start using the new package than wait forever using with the current version, which may not be compatible with the new package.

If the network 100 is the BLE-based radio network, which uses BLE radio supported point-to-point, star, or mesh topologies (BLE Mesh), an originator BLE node device, which corresponds with the sink device 106, uses the BLE radio's advertising protocol in order to distribute an advertising message in accordance with the step 216. The advertising message includes the sequence number of the new software package, whereupon it corresponds with the signalling frame 540.

Each BLE node device in the network 100 will look for possible new package, i.e. software updates, by scanning the advertising message and, when the scanning BLE node receives the advertising message in accordance with the step 218, it checks if a higher sequence number than their own is advertised by any neighboring BLE node in accordance with the step 220.

If the scanning BLE node detects the higher sequence number, it starts actions to acquire the new package in accordance with the step 222. In order to download the new package, the BLE node establishes a BLE connection with the neighboring BLE node that advertises the higher sequence number.

Since the BLE node has downloaded the new package, it sends a report to the originator BLE node by using the BLE mesh flooding or routing protocol built on top of BLE in accordance with the step 224.

The originator BLE node sends the time synchronization information, which corresponds with the timer frame 546, by the BLE advertising protocol, using the BLE mesh flooding or routing protocol in accordance with the step 228.

The download-side BLE node receives the synchronization information in accordance with the step 230 and, for one, sends the status report of receiving the time synchronization information, which corresponds with the remote status frame 547, to the originator BLE node by using the BLE mesh flooding or routing protocol in accordance with the step 232.

Finally, when the execution timer elapses, the new package is taken into use simultaneously by all BLE nodes within the network 100 in accordance with the steps 234 and 236.

Figure 6:
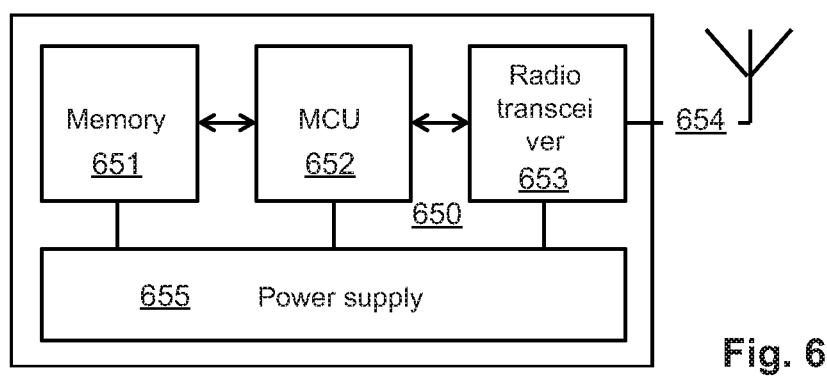
FIG. 6 presents an example of a hardware architecture of a radio node device

FIG. 6 presents a hardware architecture of a radio node device 650.

The node device (apparatus) 650 includes a memory 651, microcontroller unit (MCU) 652, a radio transceiver 653, antenna 654, and a power supply 655.

The node device 650 can be a mesh-enabled radio node device, whereupon it can a router 102, a member node 104, 108, or a sink node 106, or it can be a BLE node device.

The MCU 652 is used to run a computer program (code) for a possible application and communication protocol. The node device 650 uses the radio transceiver 653 in order to transmit and receive data between other node devices 650 and/or the gateway device(s) 106, 650, and to transmit communication frames via the antenna 654. The power supply 655 includes components for powering the device, e.g. a battery and a regulator.

The memory 651 comprises the computer program, which is configured to perform actions of the node 102, 104, 106, 108, 650 presented in this description part, when it is run in a computer, e.g. in the node 102, 104, 106, 108, 650 by means of the MCU 652.

Such action can be the production of a bi-directional radio communication with at least one another radio node device 102, 104, 106, 108, 650 by using the radio transceiver 653.

In addition, such action can be the transmission 216 of a signalling frame 540, which indicates availability to acquire the package, to at least another node 102, 104, 108 by using the radio transceiver 653, when the node 650 has a new software-distribution package in its memory 651.

In addition, such action can be the reception 218 of the signalling frame 540, from other node 102, 104, 106 by using the radio transceiver 653, when the node 650 lacks the new package.

In addition, such action can be the determination 220 whether to acquire 222 the package on a grounds of the package sequence number 541 within the received signalling frame 540, when the node 650 runs the current package of the software and it has the current package in the memory 651.

In addition, such action can be the reception (download) 222 of the new package by using the radio transceiver 653, when the node 650 uses the current package and other node 102, 104, 106 uploads the package to the node 650.

In addition, such action can be the reception 222 of a download command frame 542 from other node 102, 104, 108, which lacks the package, by using the radio transceiver 653, when the node 650 has the new package in its memory 651.

In addition, such action can be the transmission (upload) 222 of at least one data segment frame 544 to other node 102, 104, 108 by using the radio transceiver 653, when the node 650 has the new package in its memory 651 and the other node 102, 104, 108 lacks it.

In addition, such action can be the transmission 224 of a status report, which indicates that it has completed the reception 222 of the package, to the sender node 102, 104, 106 of the package by using the radio transceiver 653.

In addition, such action can be the reception 224 of the status report, which indicates that the sender node 102, 104, 106 has completed the reception 222 of the package by using the radio transceiver 653.

In addition, such action can be the transmission 228 of a timer frame 546 to other node 102, 104, 108, by using the radio transceiver 653, when the node 650 and the other node 102, 104, 108 have the new package in their memory 651.

In addition, such action can be the reception 230 of the timer frame 546 by using the radio transceiver 653, when it has sent the status frame indicating that it has download the new package and store it in the memory 651.

In addition, such action can be the setting of its update timer according to timing information in the timer frame after its reception.

In addition, such action can be the transmission 232 of a status frame 547 indicating that it has received the timing information to the sender node 102, 104, 106 of the timing information by using the radio transceiver 653.

In addition, such action can be the reception of the status frame 547, which indicates that the sender node 102, 104, 106 has received the timing information by using the radio transceiver 653.

In addition, such action can be the transmission 233 of an updated timing information in the timer frame 546 to other node 102, 104, 108 by using the radio transceiver 653, when the node 650 and the other node 102, 104, 108 have the new package in their memory 651, and the node 650 has detected that at least one of nodes 102, 104, 108 has not sent the status report.

In addition, such action can be the reception of the updated timing information in the timer frame 546 from other node 102, 104, 108 by using the radio transceiver 653.

In addition, such action can be the execution 236 of the received package at the same time with all nodes 102, 104, 106, 108 in accordance with the timing information in order to update a software of the nodes.

The aforementioned actions can be performed similarly in the BLE-enabled radio node device.

The computer program can be stored in a tangible non-volatile computer readable medium, e.g an USB stick or a CD-ROM disc.

This software-distribution method 211 provides an efficient method to distribute new software package in the network 100 so that it can be ensured that all nodes 102, 104, 106, 108 receive the new package. As there can be hundreds or thousands of nodes 102, 104, 106, 108 in the network 100, an individual download of new software is not practical.

In addition, the software-distribution method 211 enables to synchronize the moment when the new software is introduced in to use in the network 100, after successful software distribution. This ensures that all nodes 102, 104, 106, 108 start using the new software at same time and can communicate with using new software that can be non-backwards compatible with previous versions without need for supporting device with legacy software.

This software-distribution method 211 provides an individual software distribution when a software delivery might have parts that are not valid for all devices 102, 104, 106, 108 in the network 100. However, as any devices 102, 104, 106, 108 can be in the route of delivery they need to obtain new software package. For example, a mesh network 100 contains light control switches, lights, and motion detector sensors. The new software delivery contains new software for radio communication protocols and is needed by all devices 102, 104, 106, 108. The new software also contains software for correction light switches and light control application. The software package may comprise the new software and identifier for each portion of the new software so that each receiving device 102, 104, 106, 108 can identify the pieces of the new software that concerns it. As an example, the identifier may be a value of enumerated list or a pointer to a memory area that the software belongs to. As a motion detector sensor might be in data route from sink to light switch, all devices 102, 104, 106, 108 should receive all software packages for data distribution. However, when new software package is taken into use the motion sensor will only update it is radio communication software while light switches and lights update both radio communication software and application software.

In addition, the software-distribution method 211 allows to roll back also old software version in case that new software release is found erroneous when taken into use.

The invention claimed is:

1. A wireless communication network comprising:
radio nodes comprising a first radio node and a plurality of second radio nodes, the radio nodes providing a bi-directional radio communication between each other, the radio nodes receiving a software-distribution package, each of the second radio nodes having received and stored the software-distribution package sending an indication to the first radio node indicating that the software-distribution package is received and stored,
wherein, after the first radio node has received the indication that the software-distribution package has been received and stored from each of the second radio nodes that has received and stored the software-distribution package, the first radio node sends to each of the second radio nodes having sent the indication a timer frame indicating timing information that indicates a moment of time when each of the second radio nodes that has sent the indication, and the first radio node are to start to execute the received software-distribution package to simultaneously update a software of the radio nodes, and
wherein each of the first radio node and each of the second radio nodes, which has sent the indication, simultaneously update the software of the radio nodes at the indicated moment of time.

2. The network of claim 1, wherein at least one of the second radio nodes sets its update timer according to the timing information after receiving the timer frame.

3. The network of claim 2, wherein each of at least one of the second radio nodes sends to the first radio node a status frame of the indication indicating that the one of the second radio nodes received the timing information.

4. The network of claim 2, wherein the first radio node sends to at least one of the second radio nodes a signaling frame, which indicates availability to acquire the software-distribution package.

5. The network of claim 2, wherein each of at least one of the second radio nodes that stores the received software-distribution package in its memory sends a status report that is the indication indicating that the at least one of the second radio nodes completed reception of the software-distribution package.

6. The network of claim 1, wherein at least one of the second radio nodes sends to the first radio node a status frame indicating that the one of the second radio nodes received the timing information.

7. The network of claim 6, wherein the first radio node sends to at least one of the second radio nodes a signaling frame, which indicates availability to acquire the software-distribution package.

8. The network of claim 6, wherein each of at least one of the second radio nodes that stores the received software-distribution package in its memory+ sends a status report that is the indication indicating that the at least one of the second radio nodes completed reception of the software-distribution package.

9. The network of claim 1, wherein the first radio node sends to at least one of the second radio nodes a signaling frame, which indicates availability to acquire the software-distribution package.

10. The network of claim 9, wherein at least one of the second radio nodes determines whether or not to acquire the software-distribution package based on the signaling frame.

11. The network of claim 10, wherein the at least one of the second radio nodes determines whether or not to acquire the software-distribution package based on a sequence number of the software-distribution package of the first radio node.

12. The network of claim 1, wherein each of at least one of the second radio nodes that stores the received software-distribution package in its memory sends a status report that is the indication indicating that the at least one of the second radio nodes completed reception of the software-distribution package.

13. The network of claim 1, wherein at least one of the second radio nodes sends to at least a third radio node the signaling frame indicating the availability of the software-distribution package in the network after acquiring the software-distribution package, and, when the at least one second radio node receives a download command frame from at least the third radio node, which lacks the software-distribution package, the at least one second radio node sends at least one data segment frame to at least the third radio node so that at least the third radio node receives the software-distribution package.

14. The network of claim 1, wherein the first radio node sends updated timing information in the timer frame to at least one of the second radio nodes, the updated timing information indicating updated timing information when all of the radio nodes start to execute the received software-distribution package.

15. The network of claim 14, wherein the first radio node sends the updated timing information due to lack of the reception of the status frame indicating the reception of the timing information from at least one of the second radio nodes.

16. The network of claim 1, wherein the network is a wireless mesh network or a wireless Bluetooth Low Energy (BLE)-based radio network.

17. A software-updating method for a wireless communication network including radio nodes including a first radio node and a plurality of second radio nodes, the radio nodes providing a bi-directional radio communication between each other, said method comprising:
receiving, by the radio nodes, a software-distribution package;
sending, by each of the second radio nodes having received and stored the software-distribution package, an indication to the first radio node indicating that the software-distribution package is received and stored;
sending, by the first radio node, after the first radio node has received the indication that the software-distribution package has been received and stored from each of the second radio nodes that has received and stored the software-distribution package to each of the second radio nodes having sent the indication, a timer frame indicating timing information that indicates a moment of time when each of the second radio nodes that has sent the indication, and the first radio node are to start to execute the received software-distribution package to simultaneously update a software of the radio nodes;

receiving, by at least the second radio node, the timer frame; and simultaneously updating, by each of the first radio node and each of the second radio nodes, which has sent the indication, the software of the radio nodes at the indicated moment of time.

18. A radio node device for a wireless communication network, the radio node device comprising:

a microcontroller; and a radio transceiver, wherein the radio node device is configured to provide, by the radio transceiver, a bi-directional radio communication with a plurality of other radio node devices, receive, by the radio transceiver, a software-distribution package, receive, by the radio transceiver, an indication indicating that the software-distribution package is received and stored from each of the other radio node devices having received and stored the software-distribution package, send, by the radio transceiver, after the radio node device has received the indication that the software-distribution package has been received and stored from each of the other radio nodes that has received and stored the software-distribution package to each of the other radio node devices having sent the indication, a timer frame indicating timing information that indicates a moment of time when each of the other radio node devices that has sent the indication, and the radio node device are to start to execute the received software-distribution package to simultaneously update a software of the radio node devices, and update, by the radio node device simultaneously with each of the other radio node devices, which has sent the indication, the software of the radio nodes at the indicated moment of time.

19. A software-updating method for a radio node device in a wireless communication network, said radio node device including a microcontroller and a radio transceiver, said software-updating method comprising:

providing, by the radio transceiver of the radio node device, the bi-directional radio communication with at least one of a plurality of other radio node devices;

receiving, by the radio transceiver of the radio node device, a software-distribution package;

receiving, by the radio transceiver of the radio node device, an indication indicating that the software-distribution package is received and stored from each of the other radio node devices having received and stored the software-distribution package;

sending, by the radio transceiver of the radio node device, after the radio node device has received the indication that the software-distribution package has been received and stored from each of the other radio nodes that has received and stored the software-distribution package to each of the other radio node devices having sent the indication, a timer frame indicating timing information that indicates a moment of time when each of the other radio node devices that has sent the indication, and the radio node device are to start to execute the received software-distribution package to simultaneously update a software of the radio node devices; and updating, by the radio node device simultaneously with each of the other radio node devices, which has sent the indication, the software of the radio nodes at the indicated moment of time.

20. A non-transitory computer readable medium on which is stored a computer program that, when executed by a computer, performs a software-updating method for a radio node device in a wireless communication network, said radio node device including a microcontroller and a radio transceiver, said software-updating method comprising:

providing, by the radio transceiver of the radio node device, the bi-directional radio communication with at least one of a plurality of other radio node devices;

receiving, by the radio transceiver of the radio node device, a software-distribution package;

receiving, by the radio transceiver of the radio node device, an indication indicating that the software-distribution package is received and stored from each of the other radio node devices having received and stored the software-distribution package;

sending, by the radio transceiver of the radio node device, after the radio node device has received the indication that the software-distribution package has been received and stored from each of the other radio nodes that has received and stored the software-distribution package to each of the other radio node devices having sent the indication, a timer frame indicating timing information that indicates a moment of time when each of the other radio node devices that has sent the indication, and the radio node device are to start to execute the received software-distribution package to simultaneously update a software of the radio node devices; and updating, by the radio node device simultaneously with each of the other radio node devices, which has sent the indication, the software of the radio nodes at the indicated moment of time.

\* \* \* \* \*